US012655581B2

(12) United States Patent
Guilani

(10) Patent No.: US 12,655,581 B2
(45) Date of Patent: Jun. 16, 2026

(54) ELEVATOR SUSPENSION MEMBER WITH PROTECTIVE MATERIAL

(71) Applicant: OTIS ELEVATOR COMPANY, Farmington, CT (US)

(72) Inventor: Bardia Guilani, Woodstock Valley, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 18/731,471

(22) Filed: Jun. 3, 2024

(65) Prior Publication Data

US 2025/0369181 A1 Dec. 4, 2025

(51) Int. Cl.
*D07B 1/16* (2006.01)
*B66B 7/06* (2006.01)

(52) U.S. Cl.
CPC ................ *D07B 1/162* (2013.01); *B66B 7/06* (2013.01); *D07B 2201/2092* (2013.01); *D07B 2501/2007* (2013.01)

(58) Field of Classification Search
CPC ........... B66B 7/06; B66B 7/062; D07B 1/162; D07B 2501/2007
See application file for complete search history.

(56) References Cited

U.S. PATENT DOCUMENTS

| | | | | |
|---|---|---|---|---|
| 7,661,514 | B2 * | 2/2010 | Ach | B29D 29/10 474/260 |
| 8,402,731 | B2 | 3/2013 | Naito et al. | |
| 8,673,433 | B2 * | 3/2014 | Reif | B66B 7/062 474/263 |
| 11,485,611 | B2 | 11/2022 | Kodeck et al. | |
| 2005/0034375 | A1 | 2/2005 | Vanderbeken et al. | |
| 2013/0037353 | A1 * | 2/2013 | Phillips | B66B 7/062 428/377 |
| 2015/0144245 | A1 | 5/2015 | Bucher et al. | |
| 2019/0071281 | A1 * | 3/2019 | Zhao | B66B 7/062 |
| 2019/0218061 | A1 * | 7/2019 | Eastman | D07B 5/006 |
| 2021/0229955 | A1 * | 7/2021 | Yang | B32B 37/12 |

FOREIGN PATENT DOCUMENTS

| | | | | |
|---|---|---|---|---|
| DE | 102010042357 | A1 * | 4/2012 | B29C 47/0021 |
| EP | 1074369 | A1 | 2/2001 | |
| EP | 2508459 | A1 | 10/2012 | |
| EP | 3487802 | A1 | 9/2020 | |

(Continued)

OTHER PUBLICATIONS

Chen, Teng Ko et al., "Glass Transition Behaviors of a Polyurethane Hard Segment based on 4,4'-Diisocyanatodiphenylmethane and 1,4-Butanediol and the Calculation of Microdomain Composition" Macromolecules, vol. 30, Aug. 25, 1997. attached as: Published-Evidence-2.pdf.

(Continued)

*Primary Examiner* — Minh Truong
*Assistant Examiner* — Michelle M Mudwilder
(74) *Attorney, Agent, or Firm* — Carlson, Gaskey & Olds, P.C.

(57) ABSTRACT

An assembly and method includes selecting a jacket material for a jacket that encases a plurality of tension members, selecting a protective material for the jacket, and covering only pre-identified portions of the jacket with the protective material.

12 Claims, 3 Drawing Sheets

(56) References Cited

FOREIGN PATENT DOCUMENTS

| | | | | |
|---|---|---|---|---|
| JP | 2011006519 A | | 1/2011 | |
| WO | 2004076327 A1 | | 9/2004 | |
| WO | WO-2006085881 A1 | * | 8/2006 | ............. B29C 59/02 |
| WO | WO-2009127241 A1 | * | 10/2009 | ......... B29C 37/0067 |
| WO | WO-2011067839 A1 | * | 6/2011 | ............... B66B 7/06 |
| WO | 2015165777 A1 | | 11/2015 | |
| WO | 2016116457 A1 | | 7/2016 | |

OTHER PUBLICATIONS

Somdee, Patcharapon et al., "Thermal analysis of polyurethane elastomers matrix with different chain extender contents for thermal conductive application" Journal of Thermal Analysis and Calorimetry, vol. 138, Mar. 23, 2019. Attached as: Published-Evidence-1.pdf.

Engineering Materials Handbook: vol. 2, Engineering Plastics ASM International, 1988. original file name: D6 TPU_Engineering-Mat-Handbook.pdf. Attached as: Published-Evidence-6.pdf.

Szycher, Michael, "Szycher's Handbook of Polyurethanes" CRC Press, 1999. Attached as: Published-Evidence-7.pdf.

* cited by examiner

ELEVATOR SUSPENSION MEMBER WITH PROTECTIVE MATERIAL

BACKGROUND

Elevator systems are in widespread use for carrying passengers between various levels in buildings. Some elevator systems are traction-based in which a suspension assembly, sometimes referred to as roping, suspends the elevator car and a counterweight. The suspension assembly also facilitates movement of the elevator car when needed. Traditional suspension assemblies include round steel ropes; however, elevator systems have also included other types of suspension members, such as flat belts or other types of ropes that have tension members encased in a compressible polymer jacket. Under certain operating conditions, such suspension members may come into contact with foreign objects or debris. This type of contact may lead to other undesirable effects to the suspension members over time.

SUMMARY

An illustrative example assembly includes: at least one suspension member that supports an elevator car and facilitates movement of the elevator car within a hoistway; a jacket that encases the at least one suspension member, wherein the jacket comprises a first type of material; and protective material that covers only pre-identified portions of the jacket, wherein the protective material comprises a second type of material different than the first type of material.

In addition to one or more of the features described herein, or as an alternative, the protective material comprises a cold temperature resistant jacket material.

In addition to one or more of the features described herein, or as an alternative, the cold temperature resistant jacket material comprises material suitable for temperatures at freezing or below −30° C.

In addition to one or more of the features described herein, or as an alternative, the first type of material comprises a first thermoplastic polyurethane elastomer having at least a first characteristic and the cold temperature resistant jacket material comprises a second thermoplastic polyurethane elastomer having at least a second characteristic different than the first characteristic.

In addition to one or more of the features described herein, or as an alternative, the first characteristic comprises a first fatigue resistance and the second characteristic comprises a second fatigue resistance that is greater than the first fatigue resistance.

In addition to one or more of the features described herein, or as an alternative, the first characteristic comprises a first glass transition temperature and the second characteristic comprises a second glass transition temperature that is less than the first glass transition temperature.

In addition to one or more of the features described herein, or as an alternative, the jacket has an external facing side and a traction side that faces opposite of the external facing side, and wherein the pre-identified portions of the jacket comprise at least one of the external facing side and the traction side.

In addition to one or more of the features described herein, or as an alternative, protective material comprises a layer of material that is applied to cover both the external facing side and the traction side.

In addition to one or more of the features described herein, or as an alternative, protective material comprises a layer of material that is applied to cover only one of the external facing side and the traction side.

In addition to one or more of the features described herein, or as an alternative, the jacket has a cross-sectional volume and wherein the protective material comprises approximately half of the cross-sectional volume.

In addition to one or more of the features described herein, or as an alternative, the at least one suspension member comprises a plurality of tension members encased within the jacket.

An illustrative example method includes: selecting a jacket material for a jacket that encases a plurality of tension members; selecting a protective material for the jacket; and covering only pre-identified portions of the jacket with the protective material.

In addition to one or more of the features described herein, or as an alternative, the method including performing at least one mechanical test to identify the protective material.

In addition to one or more of the features described herein, or as an alternative, the at least one mechanical test comprises at least a crack propagation test.

In addition to one or more of the features described herein, or as an alternative, the protective material comprises a cold temperature jacket material suitable for temperatures at freezing or below −30° C.

In addition to one or more of the features described herein, or as an alternative, the jacket material comprises a first thermoplastic polyurethane elastomer having at least a first characteristic and the cold temperature resistant jacket material comprises a second thermoplastic polyurethane elastomer having at least a second characteristic different than the first characteristic.

In addition to one or more of the features described herein, or as an alternative, the first characteristic comprises a first fatigue resistance and the second characteristic comprises a second fatigue resistance that is greater than the first fatigue resistance.

In addition to one or more of the features described herein, or as an alternative, the method including applying a layer of the protective material to cover both an external facing side and a traction side of the jacket.

In addition to one or more of the features described herein, or as an alternative, the method including applying a layer of the protective material to cover only one of an external facing side and a traction side of the jacket.

In addition to one or more of the features described herein, or as an alternative, the jacket has a cross-sectional volume and including using the protective material for approximately half of the cross-sectional volume.

The various features and advantages of an example embodiment will become apparent to those skilled in the art from the following detailed description. The drawings that accompany the detailed description can be briefly described as follows.

DETAILED DESCRIPTION

Embodiments of this disclosure provide an elevator suspension member that includes protective material in areas prone to receive contact from foreign objects or debris.

Figure 1:
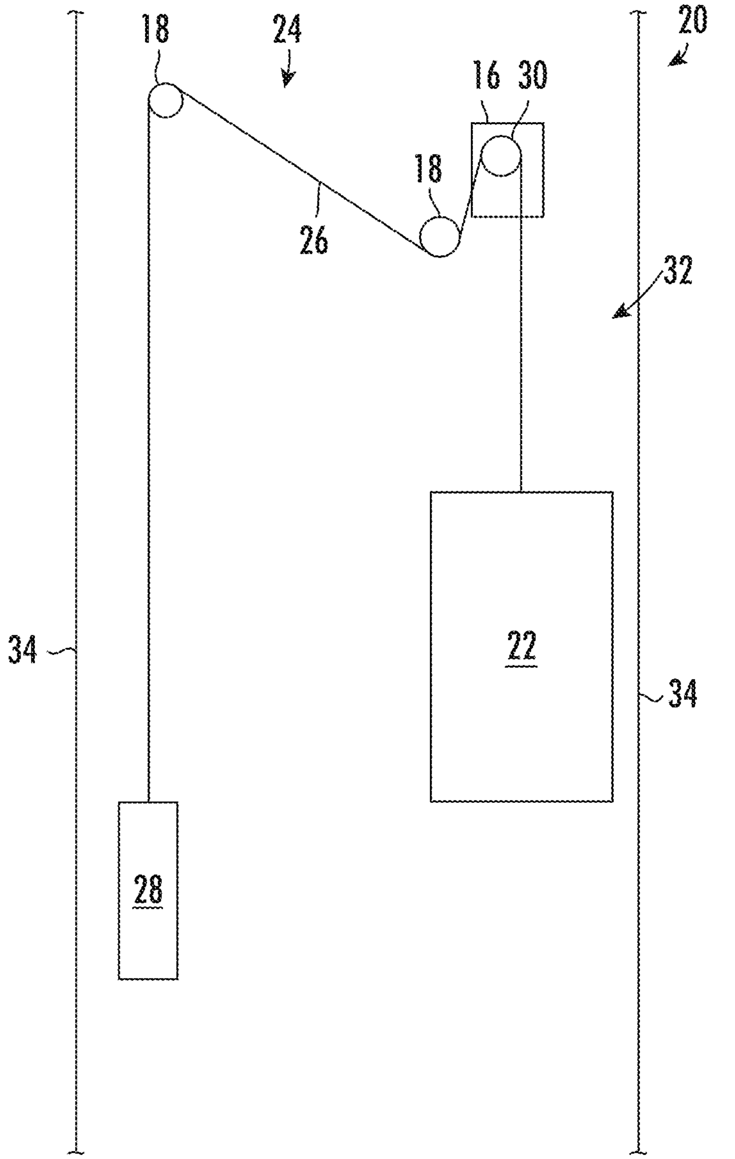
FIG. 1 schematically illustrates selected portions of an elevator system.

FIG. 1 schematically illustrates selected portions of an elevator system 20. An elevator car 22 is supported by a roping arrangement or suspension assembly 24 that includes a plurality of suspension members 26. In one example, the elevator system 20 is a traction-based system in which a controller controls operation of a machine 16 to cause selected movement of the elevator car 22. The elevator car 22 is coupled to a counterweight 28 by the suspension members 26. The suspension members 26 are driven by the machine 16 around a traction sheave 30, as well as any additional deflector sheaves 18, as the elevator car 22 moves within a hoistway 32 between landings or levels.

Figure 2:
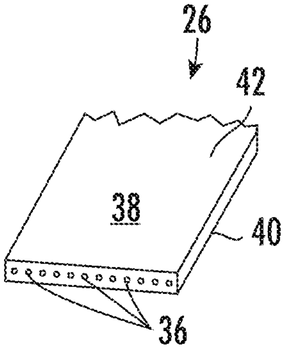
FIG. 2 schematically illustrates a portion of an example suspension member.

FIG. 2 schematically illustrates a portion of an example suspension member 26. In the illustrated embodiment, the suspension member 26 is a flat belt including a plurality of tension members 36 encased in a jacket 38 of a compressible material, such as polyurethane or other similar materials for example. In many embodiments, the tension members 36 are steel cords, and the suspension member 26 is referred to as a coated steel belt (CSB), for example. Other embodiments include tension members that are made of different materials and jacket surfaces that are not flat, such as those that incorporate ribs, grooves, or similar features.

The hoistway 32 may be situated in a variety of locations within a building, depending on the building configuration. Under certain operating conditions, as the elevator car 22 moves within the hoistway 32, the suspension members 26 may be adversely affected by contact with foreign objects or falling debris. In certain instances, this contact can progress to cause other undesirable effects such as cracking and splitting of the jacket 38, especially when the suspension member 26 bends over the smaller diameter sheaves in a system, such as the traction sheave 30 for example.

As shown in FIG. 2, the jacket 38 has an external facing side 40 and a traction side 42, e.g. internal facing side opposite of the external facing side 40, which is supported on the traction sheave 30. In implementations shown in FIGS. 3-5, the jacket 38 may be made from a jacket material 50, e.g. a first type of material. In one example, the jacket material 50 may be an elastomeric material such as a thermoplastic polyurethane (TPU) elastomer, for example.

The subject disclosure provides a suspension member 26 where additional protective material 52, e.g., a second type of material, is applied to one or more areas of the suspension member 26 that are most likely to experience undesirable contact from foreign objects.

In one example, the protective material 52 may be a type of material that is different than the jacket material 50.

In implementations, the protective material 52 covers only pre-identified portions of the jacket 38. In one example, the pre-identified portions of the jacket 38 are areas that are most susceptible to contact from foreign objects or debris.

In implementations, the additional protective material 52 is applied as a thin layer to these areas.

In one example, the protective material 52 may be a cold temperature resistant jacket material. In implementations, the cold temperature resistant jacket material is a material suitable to operate at temperatures of freezing or below −30° C.

In implementations, the jacket material 50 may be a first thermoplastic polyurethane elastomer having at least first characteristic and the protective material 52 may be a second thermoplastic polyurethane elastomer having at least second characteristic different than the first characteristic.

In one example, the first characteristic of the jacket material 50 may be a first fatigue resistance and the second characteristic of the protective material 52 may be a second fatigue resistance that is greater than the first fatigue resistance.

In one example, the first characteristic of the jacket material 50 may be a first glass transition temperature and the second characteristic of the protective material 52 may be a second glass transition temperature that is less than the first glass transition temperature.

In implementations, selection of the protective material 52 involves performing at least one mechanical test to identify an appropriate protective material.

In implementations, the protective material 52 is selected to have a higher fatigue resistance, measured by one or more standard mechanical tests, than jacket material 50 at the portions of the suspension member 26 that are less prone to undesirable contact.

In one example, the at least one mechanical test may be at least a crack propagation test. In implementations, a crack propagation test may involve providing a notch in a jacket with subsequent load cycling as described below.

In one example, a sample is prepared by cutting a specimen from one type of protective material to ensure the sample meets the required dimensions for testing. Next, a notch is created in the sample that has a specified length and depth at a predetermined location on the sample. The notch serves as the initial crack from which propagation will be studied. In one example, testing setup includes setting up the testing apparatus in a controlled environment, and installing the protective material sample into a testing machine, ensuring proper alignment and fixation. Next, the temperature of the testing environment is controlled to a predetermined temperature required for the test. This temperature may vary depending on the material properties and the conditions the suspension member 26 is expected to endure in real-world applications. Cyclic loads are then applied to the protective material sample using the testing machine. The loading may simulate the typical stresses experienced by the suspension member 26 during operation, including tension, compression, and bending, for example. The loads maybe applied cyclically, allowing the material to respond and the crack to propagate.

In implementations, appropriate instrumentation, e.g., crack gauges or optical microscopy, is used to monitor the propagation of the crack originating from the notch. The crack length may then be recorded at regular intervals or after a certain number of load cycles. Data collection may continue throughout the test up to the point of sample fracture by collecting data on the applied loads, temperature, and crack propagation behavior. This data may then be used for analyzing the performance of the material under cyclic loading conditions and at the predetermined temperature. The collected data may then be analyzed to determine key parameters such as, for example, crack growth rate, fatigue life, fatigue resistance, and fracture toughness of the material under the specified conditions.

This type of test can be performed on many different types and samples of protective materials. For example, thermoplastic polyurethane elastomer materials having different fatigue resistances and/or different glass transition temperatures can each be tested. Based on the analysis of the test results for each sample, and based on a comparison of the crack propagation behavior of each of the materials under cyclic loading and at the predetermined temperature, an appropriate protective material can be selected. In implementations, the protective material 52 is selected based on having a higher fatigue resistance than the jacket material 50. Thus, those skilled in the art who have the benefit of this description will be able to determine which protective material to use for each elevator application.

Such protective material may be more expensive than the jacket material. This is why, as discussed above, the protective material 52 is only used at pre-identified portions of the jacket 38 that are the most susceptible to contact from debris.

Figure 3:
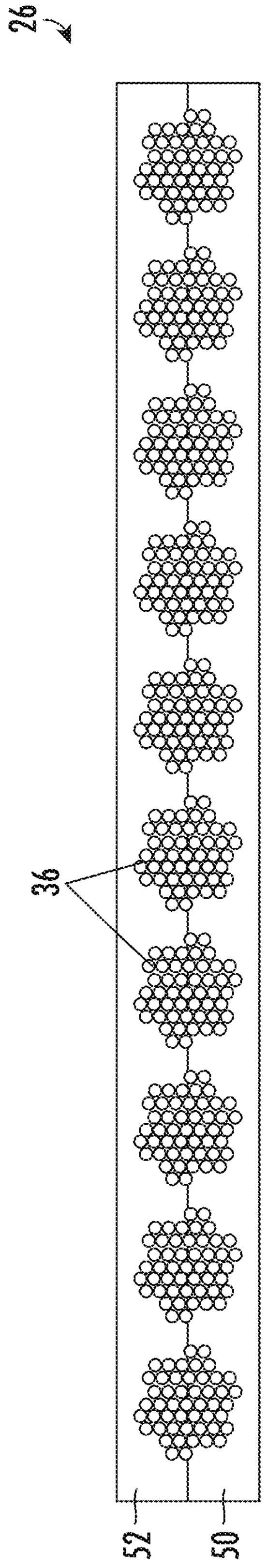
FIG. 3 schematically illustrates one example of a suspension member with a protective material.

As shown in FIG. 3, the jacket 38 has a cross-sectional volume where the protective material 52 is one portion of the volume and the jacket material 50 provides a remaining portion of the volume. In one example, the protective material 52 is approximately half of the cross-sectional volume.

Figure 4:
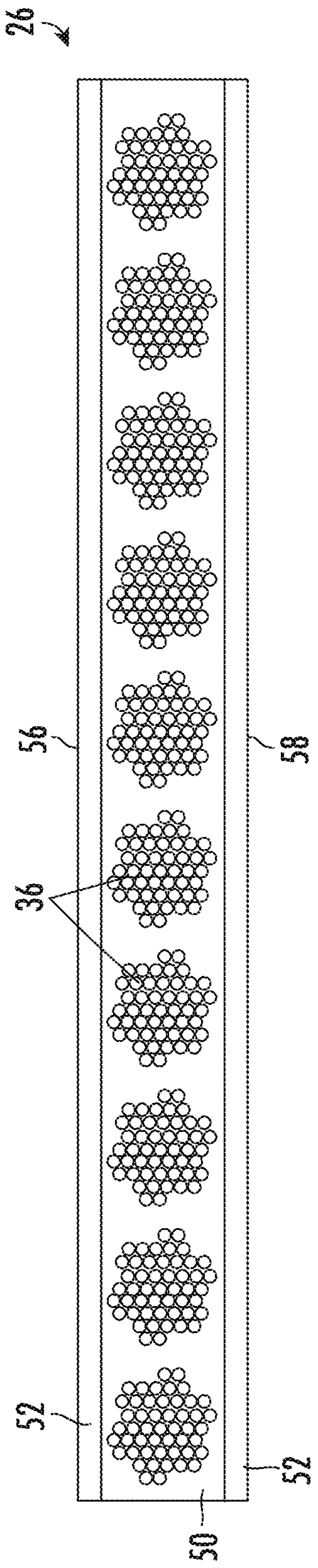
FIG. 4 schematically illustrates another example of a suspension member with a protective material.

In one example shown in FIG. 4, the protective material 52 comprises a layer of material that is applied to cover both the external facing side 40 and the traction side 42 of the jacket 38. As such, a first layer 56 is applied to the external facing side 40 and a second layer 58 is applied to the traction side 42.

Figure 5:
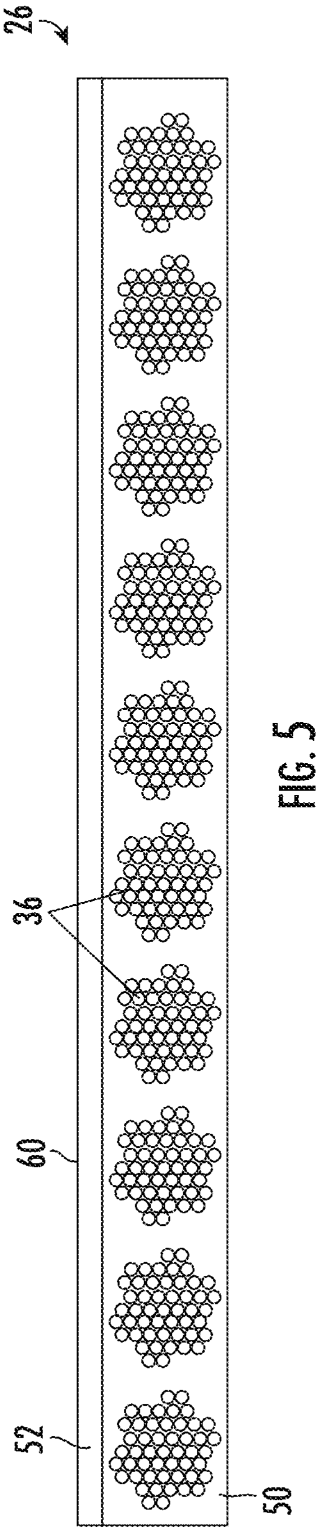
FIG. 5 schematically illustrates another example of a suspension member with a protective material.

In one example shown in FIG. 5, the protective material comprises a layer 60 of material that is applied to cover only one of the external facing side 40 and the traction side 42. In implementations, the side that is selected is the one that would be most prone to contact from debris. In the example shown, the layer 60 is on the external facing side 40.

Figure 6:
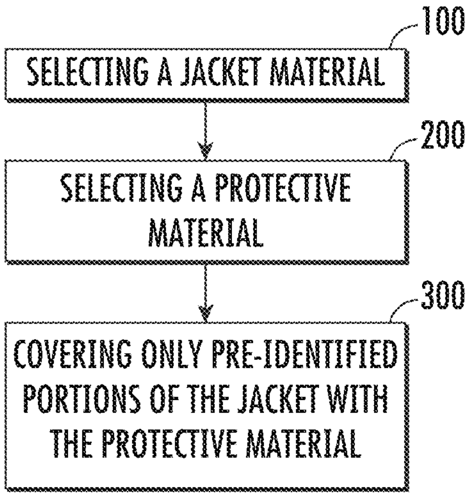
FIG. 6 is a flowchart diagram of an example method of selecting and applying a protective material to a suspension member.

FIG. 6 shows a flowchart for one example method for selecting and applying materials to provide the suspension members 26. In implementations, the method may include selecting a jacket material 50 for a jacket 38 that encases a plurality of tension members 36, as indicated at step 100. The method may include selecting a protective material 52 for the jacket 38, as indicated at step 200. The method may include covering only pre-identified portions of the jacket 38 with the protective material, as indicated at step 300.

The method may further include any of the following steps either alone or in any combination thereof.

The method may include performing at least one mechanical test to identify the protective material.

The method may include having the at least one mechanical test be at least a crack propagation test.

The method may include having the protective material be a cold temperature jacket material suitable for temperatures at freezing or below −30° C.

The method may include having the jacket material be a first thermoplastic polyurethane elastomer having at least first characteristic and having the cold temperature resistant jacket material be a second thermoplastic polyurethane elastomer having at least second characteristic different than the first characteristic.

The method may include having the first characteristic be a first fatigue resistance and the second characteristic be a second fatigue resistance that is greater than the first fatigue resistance.

The method may include applying a layer of the protective material to cover both an external facing side and a traction side of the jacket.

The method may include applying a layer of the protective material to cover only one of an external facing side and a traction side of the jacket.

The method may include using the protective material for approximately half of a cross-sectional volume of the jacket.

In one example, each implementation may be manufactured via conventional mold wheel or direct extrusion processes typically used to manufacture suspension members.

The subject disclosure provides the most cost-optimized suspension member that utilizes a higher cost protective material only in certain areas where the material is applied to one or more portions that are most prone to undesirable contact.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. An assembly comprising:

at least one suspension member that supports an elevator car and facilitates movement of the elevator car within a hoistway;

a jacket that encases the at least one suspension member, wherein the jacket comprises a first type of material;

protective material that covers only pre-identified portions of the jacket, wherein the protective material comprises a second type of material different than the first type of material, and wherein the protective material comprises a layer of material that extends from one side of the at least one suspension member to an opposite side of the at least one suspension member;

wherein the first type of material comprises a first thermoplastic polyurethane elastomer having at least a first characteristic;

wherein the protective material comprises a cold temperature resistant jacket material, and wherein the cold temperature resistant jacket material comprises a second thermoplastic polyurethane elastomer having at least a second characteristic different than the first characteristic;

wherein the cold temperature resistant jacket material comprises material suitable for temperatures at freezing or below −30° C.; and wherein the first characteristic comprises a first glass transition temperature and the second characteristic comprises a second glass transition temperature that is less than the first glass transition temperature.

2. The assembly of claim 1, wherein the jacket has an external facing side and a traction side that faces opposite of the external facing side, and wherein the pre-identified portions of the jacket comprise at least one of the external facing side and the traction side.

3. The assembly of claim 2, wherein protective material comprises a layer of material that is applied to cover both the external facing side and the traction side.

4. The assembly of claim 2, wherein the layer of material is applied to cover only one of the external facing side and the traction side.

5. The assembly of claim 1, wherein the jacket has a cross-sectional volume and wherein the protective material comprises approximately half of the cross-sectional volume.

6. The assembly of claim 1, wherein the at least one suspension member comprises a plurality of tension members encased within the jacket.

7. A method comprising:

selecting a jacket material for a jacket that encases a plurality of tension members to provide a suspension member;

selecting a protective material for the jacket;

covering only pre-identified portions of the jacket with the protective material by applying the protective material as a layer of material that extends from one side of the suspension member to an opposite side of the suspension member;

wherein the protective material comprises a cold temperature jacket material suitable for temperatures at freezing or below;

wherein the jacket material comprises a first thermoplastic polyurethane elastomer having at least a first characteristic and the cold temperature jacket material comprises a second thermoplastic polyurethane elastomer having at least a second characteristic different than the first characteristic; and wherein the first characteristic comprises a first glass transition temperature and the second characteristic comprises a second glass transition temperature that is less than the first glass transition temperature.

8. The method of claim 7, including performing at least one mechanical test to identify the protective material.

9. The method of claim 8, wherein the at least one mechanical test comprises at least a crack propagation test.

10. The method of claim 7, including applying the layer of the protective material to cover both an external facing side and a traction side of the jacket.

11. The method of claim 7, including applying the layer of the protective material to cover only one of an external facing side and a traction side of the jacket.

12. The method of claim 7, wherein the jacket has a cross-sectional volume and including using the protective material for approximately half of the cross-sectional volume.

* * * * *